(12) United States Patent
Ebert

(10) Patent No.: US 7,716,799 B2
(45) Date of Patent: May 18, 2010

(54) STEERING KNUCKLE BORING APPARATUS

(76) Inventor: James L. Ebert, 10003 State R. 13, Huron, OH (US) 44839

( * ) Notice: Subject to any disclaimer, the term of this patent is extended or adjusted under 35 U.S.C. 154(b) by 1303 days.

(21) Appl. No.: 11/209,593

(22) Filed: Aug. 23, 2005

(65) Prior Publication Data
US 2007/0050962 A1     Mar. 8, 2007

(51) Int. Cl.
*B23P 19/04*     (2006.01)
*B23P 6/00*      (2006.01)

(52) U.S. Cl. .............................. 29/402.08; 29/402.03

(58) Field of Classification Search ............ 29/888.011, 29/33 R, 560, 402.08, 402.03, 26 A; 82/1.11; 408/75, 79; 407/165, 225, 227
See application file for complete search history.

(56) References Cited

U.S. PATENT DOCUMENTS

| | | | |
|---|---|---|---|
| 1,734,787 A | 11/1929 | Appleton | |
| 2,549,381 A | 4/1951 | Matica | |
| 3,279,282 A * | 10/1966 | Gill | ............... 76/40 |
| 4,098,029 A | 7/1978 | Shiets | |
| 4,455,732 A | 6/1984 | Shiets | |
| 4,486,938 A | 12/1984 | Hext | |
| 4,571,795 A | 2/1986 | Shiets | |
| 4,820,089 A | 4/1989 | Shiets | |
| 4,969,246 A | 11/1990 | Shiets | |
| 5,590,466 A * | 1/1997 | Harmand | ............... 29/888.011 |
| 5,966,812 A | 10/1999 | Shiets | |
| 6,024,418 A | 2/2000 | Ebert | |

* cited by examiner

*Primary Examiner*—John C Hong
(74) *Attorney, Agent, or Firm*—David D. Murray; Vivacqua Law, PLLC

(57) ABSTRACT

An apparatus for repairing steering knuckle (kingpin) bearings includes a table having multiple, adjustable slides for receiving and securing the steering knuckle to the table, a boring bar and cutter, two adjustable bearing supports for receiving and positioning the boring bar along an axis coincident with the axis of the kingpin bearings, a first drive assembly for advancing the boring bar and a second drive assembly for rotating the boring bar. A method of repairing a steering knuckle comprises securing the knuckle to the slides and the slides to the table, utilizing cylindrical centering rings to align the boring bar with the axis of the kingpin bearings, supporting and securing the boring bar on the previously established axis in a pair of bearing supports and rotating and feeding the boring bar and cutter to create new surfaces in the steering knuckle adapted to receive bearing sleeves. Upon installation of both bearing sleeves, the boring bar and drive unit are reinstalled and the inside diameter of the sleeve is bored to the proper size to receive the kingpin.

20 Claims, 10 Drawing Sheets

US 7,716,799 B2

STEERING KNUCKLE BORING APPARATUS

TECHNICAL FIELD

The invention relates to a specialized boring apparatus and method and particularly to an apparatus and method for repairing worn and oversized kingpin bores in motor vehicle steering knuckles.

BACKGROUND OF THE INVENTION

The most common geometric arrangement for front wheels of trucks and heavy duty motor vehicles comprehends defining left and right converging oblique axes about which the front wheels pivot to steer the vehicle. These axes are defined by a component denominated the kingpin. The kingpin extends between two spaced apart bearing structures extending from a steering knuckle and pivotally couples it to an end of the front axle. The steering knuckle includes a spindle upon which a front tire and wheel are rotatably supported and secured and a flange to which a front brake assembly is mounted. Each end of the front axle includes an eye which receives the kingpin and defines the pivot axis of the steering knuckle. Thrust bearings are disposed between each of the bearing structures and the end of the axle. The steering knuckle also includes an attachment feature to which a component of the steering mechanism, such as the Pittman arm or a tie rod, is attached.

Given the portion of the vehicle weight carried by the front tires, the expected and often exceeded service life of the vehicle and various road hazards, it is not surprising that the kingpin bearings deteriorate, allowing excessive play in the front wheel suspension which slowly renders the steering unsafe and causes excessive tire wear.

Given the direct cost of replacing the steering knuckle wherein frequently only the kingpin bearing surfaces have deteriorated, and the indirect cost related to the vehicle downtime, it is understandable that various repair methods have been proposed. For example, in U.S. Pat. No. 4,969,246, repair of the bearing portion within the axle is described. The axle end or eye is tightly engaged by a fixture which facilitates on-site repair of the axle eye. While this method and apparatus offered a simplified repair process and reduced the cost of repairing axle bearing failures, primarily due to its on-site capability, it did not address how repair of the more frequently worn or damaged bearings in the steering knuckle could be achieved. The present invention is so directed.

SUMMARY OF THE INVENTION

An apparatus for repairing steering knuckle (kingpin) bearings includes a table having multiple, adjustable slides for receiving and securing the steering knuckle to the table, a boring bar and cutter, two adjustable bearing supports for receiving and positioning the boring bar along an axis coincident with the axis of the kingpin bearings, a first drive assembly for advancing the boring bar and a second drive assembly for rotating the boring bar. A method of repairing a steering knuckle comprises securing the knuckle to the slides and the slides to the table, utilizing cylindrical centering rings to align the boring bar with the axis of the kingpin bearings, supporting and securing the boring bar on the previously established axis in a pair of bearing supports and rotating and feeding the boring bar and cutter to create new surfaces in the steering knuckle adapted to receive bearing sleeves. Upon installation of both bearing sleeves, the boring bar and drive unit are reinstalled and the inside diameter of the sleeve is bored to the proper size to receive the kingpin.

These and other aspects and advantages of the present invention will become apparent upon study of the following description of the preferred embodiment and appended drawings wherein like reference numbers refer to the same component, element or feature.

DESCRIPTION OF THE PREFERRED EMBODIMENTS

Figure 1:
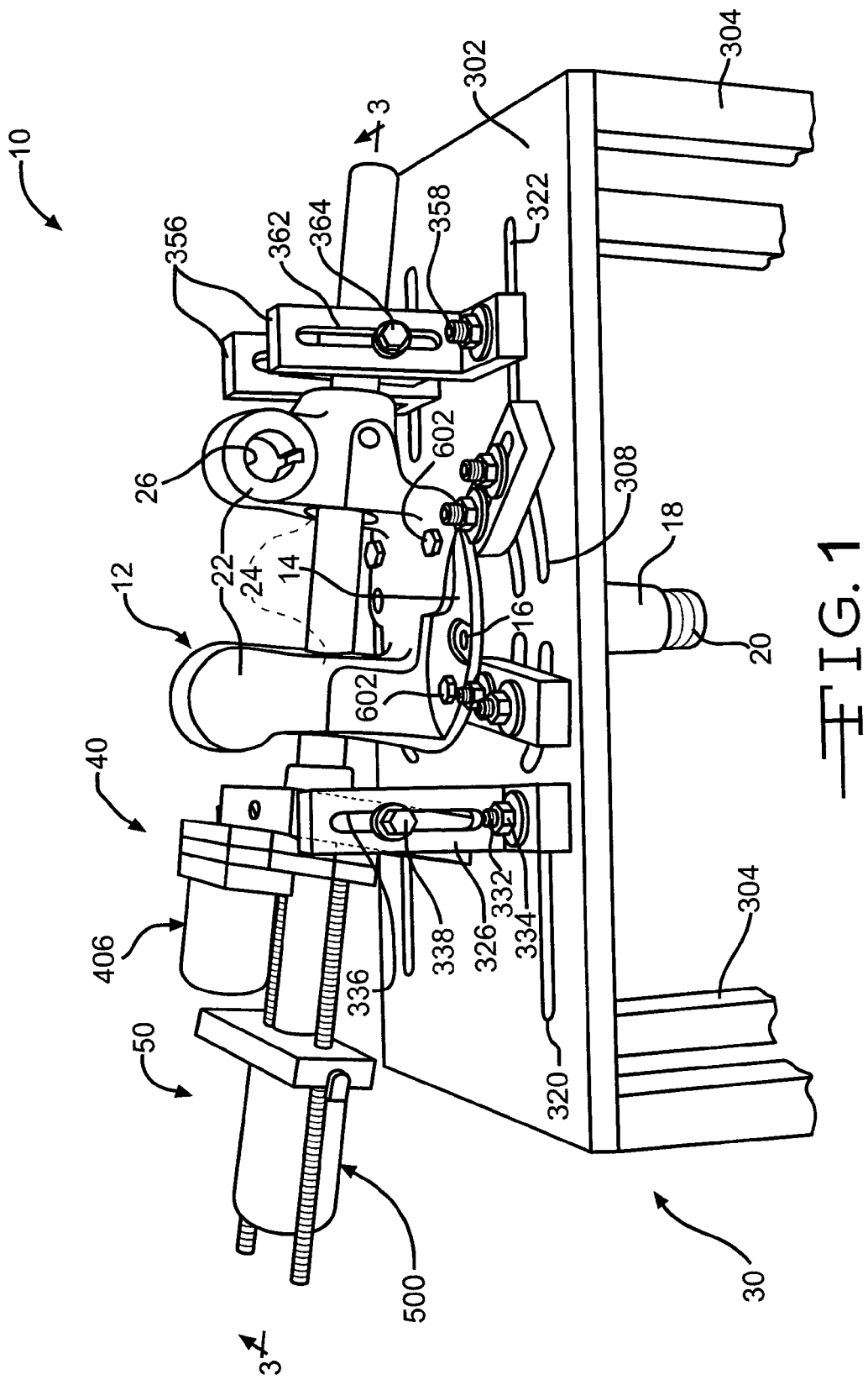
FIG. 1 is a perspective view of a first embodiment of a steering knuckle boring apparatus according to the present invention with a steering knuckle in place thereupon.

Referring now to FIG. 1, a first embodiment of an apparatus for repairing motor vehicle steering knuckles is illustrated and generally designated by the reference number 10. The apparatus 10 cooperates with and repairs a motor vehicle, typically truck or industrial or heavy duty, steering knuckle assembly 12. The steering knuckle assembly 12 includes a generally circular, flat body or brake flange 14 having a plurality of through apertures 16 which receive fasteners for securing, for example, brake components when the steering knuckle assembly 12 is installed in a vehicle. Extending perpendicularly to the brake flange 14 is a spindle 18 typically including a threaded terminal portion 20. On the side of the brake flange 14 opposite the spindle 18 are a pair of relatively large ears or lugs 22 which both define oblique, aligned, kingpin receiving through bearing passageways 24. At least one of the lugs or ears 22, and often both, include a feature or circular passageway 26 to which components of the vehicle steering system such as a Pittman arm or a tie rod (both not illustrated) are secured.

Figure 8:
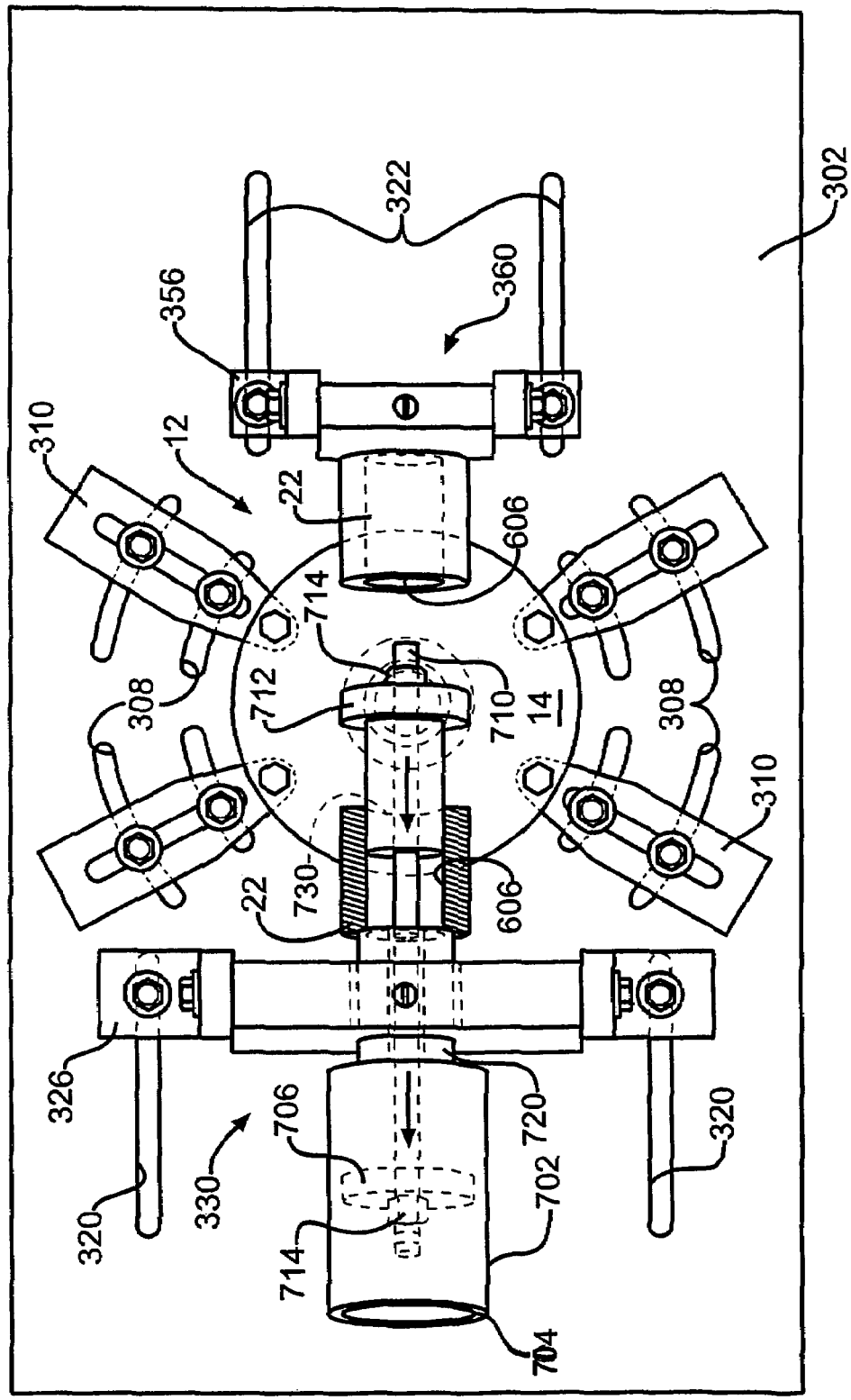
FIG. 8 is a top, plan view of a steering knuckle boring apparatus according to the present invention illustrating installation of a sleeve in one of the bearing structures of the steering knuckle.

The steering knuckle repair apparatus 10 includes a rigid support assembly 30, a boring bar feed assembly 40 and a boring bar drive assembly 50. A hydraulic cylinder assembly 70, illustrated in FIG. 8, is also a component of the apparatus 10 and is utilized during the repair procedure.

Figure 2:
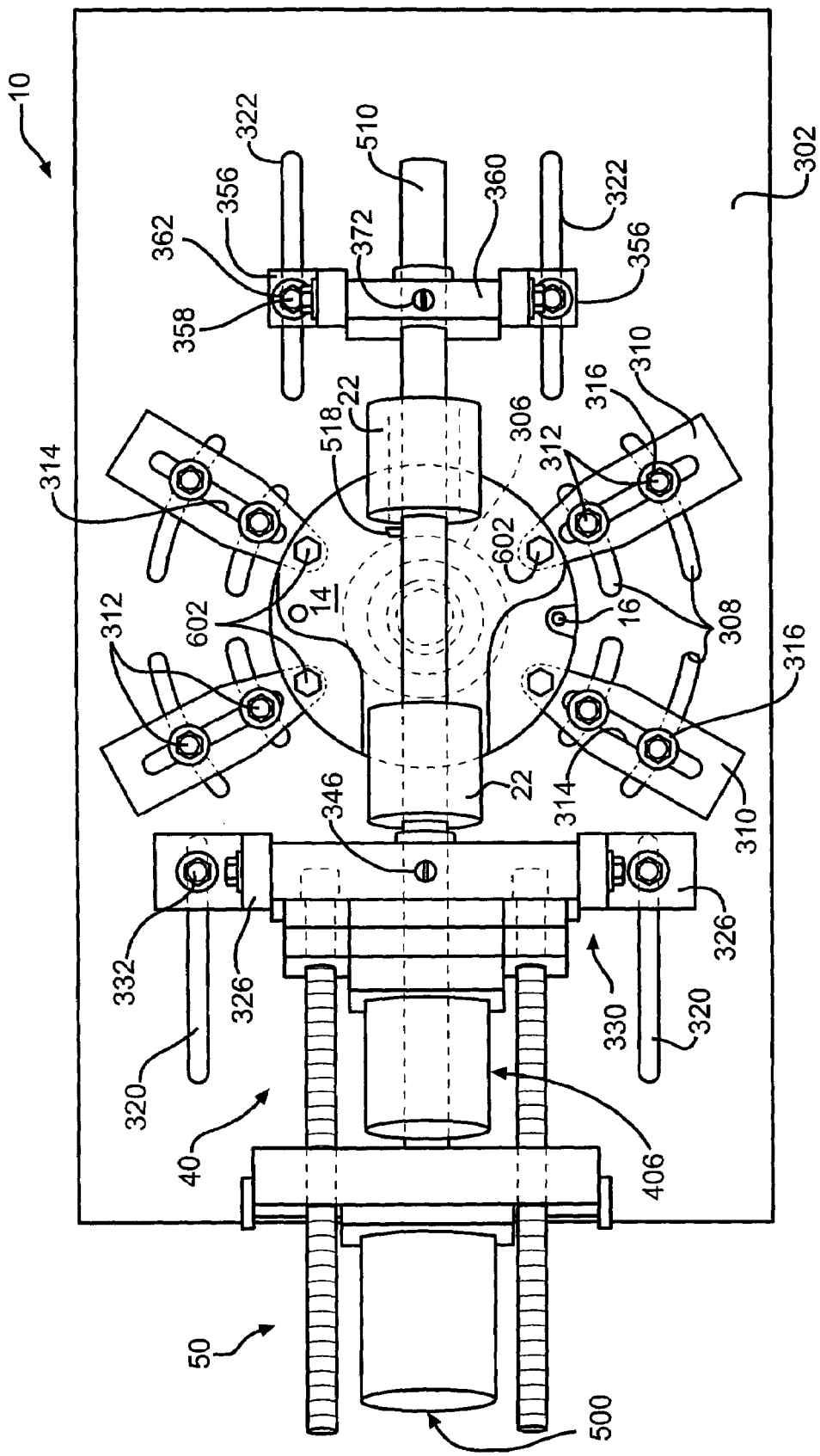
FIG. 2 is a top, plan view of a steering knuckle boring apparatus according to the present invention with a steering knuckle in place thereupon.

Referring now to FIGS. 1 and 2, the rigid support assembly 30 includes a rigid, planar support table 302 which is preferably fabricated of steel having a thickness of at least one-half inch (12.7 millimeters) or thicker having a flat, smooth upper surface. The support table 302 is secured to and supported upon vertical legs 304 which preferably extend approximately three feet (0.95 meters) to raise the support table 302 to a convenient, working height. At a minimum, the legs 304 are long enough that the spindle 18 of a typical steering knuckle assembly 12 secured to the support table 302 will not contact or interfere with the leg supporting surface such as a bench or low table (not illustrated). Centrally disposed within the support table 302 is a circular opening 306 which receives the spindle 18 of the steering knuckle assembly 12.

Four pairs of arcuate slots 308 are arranged concentrically about the circular opening 306. The arcuate slots 308 are preferably arranged into adjacent pairs defining an acute included angle of approximately 60°. The adjacent pairs of arcuate slots 308 are separated by, a wider angle of approximately 120° which provides clearance for other assemblies. Received upon each pair of the four pairs of slots 308 is a mounting finger 310. The four mounting fingers 310 are both adjustable and securable to the support table 302 by virtue of a pair of threaded fasteners such as bolts 312 which extend through both a longitudinal slot 314 in the fingers 310 and one of each of the pair of slots 308 in the support table 302. The threaded fasteners or bolts 312 are secured by nuts and washers 316 and include enlarged heads and regions of square cross sections (both not illustrated) similar to carriage bolts which prevent the threaded fasteners or bolts 312 from passing through the slots 308 and prevent rotation of the threaded fasteners or bolts 312 in the slots 308, respectively, thereby simplifying and speeding tightening and release thereof.

The support table 302 also includes a first pair of parallel, more widely spaced apart slots 320 disposed on one side of the circular opening 306 and a second pair of parallel, more closely spaced apart slots 322 on the opposite side of the circular opening 306. Within the first pair of slots 320 are disposed a first pair of symmetrically arranged angle brackets 326 which support a first bearing assembly or headstock 330. Each of the first pair of brackets 326 includes a through aperture (not illustrated) which receives one of a pair of bolts or threaded fasteners 332 extending through the support table 302. Once again, the heads of the threaded fasteners 332 are enlarged and include a square cross-section portion that prevents them from passing through the slots 320 and inhibits rotation thereof such that a nut and washer 334 may be readily tightened and loosened to secure the first pair of angle brackets 326 to the support table 302. The headstock assembly 330 is likewise secured to the first pair of angle brackets 326, which each include an elongate vertical slot 336, by a pair of bolts or threaded fasteners and washers 338. The headstock assembly 330 includes a headstock ball bearing assembly 342, illustrated in FIG. 5, which may be secured and released from a through passageway 344 formed in the headstock assembly 330 by at least one suitable set screw 346.

Figure 5:
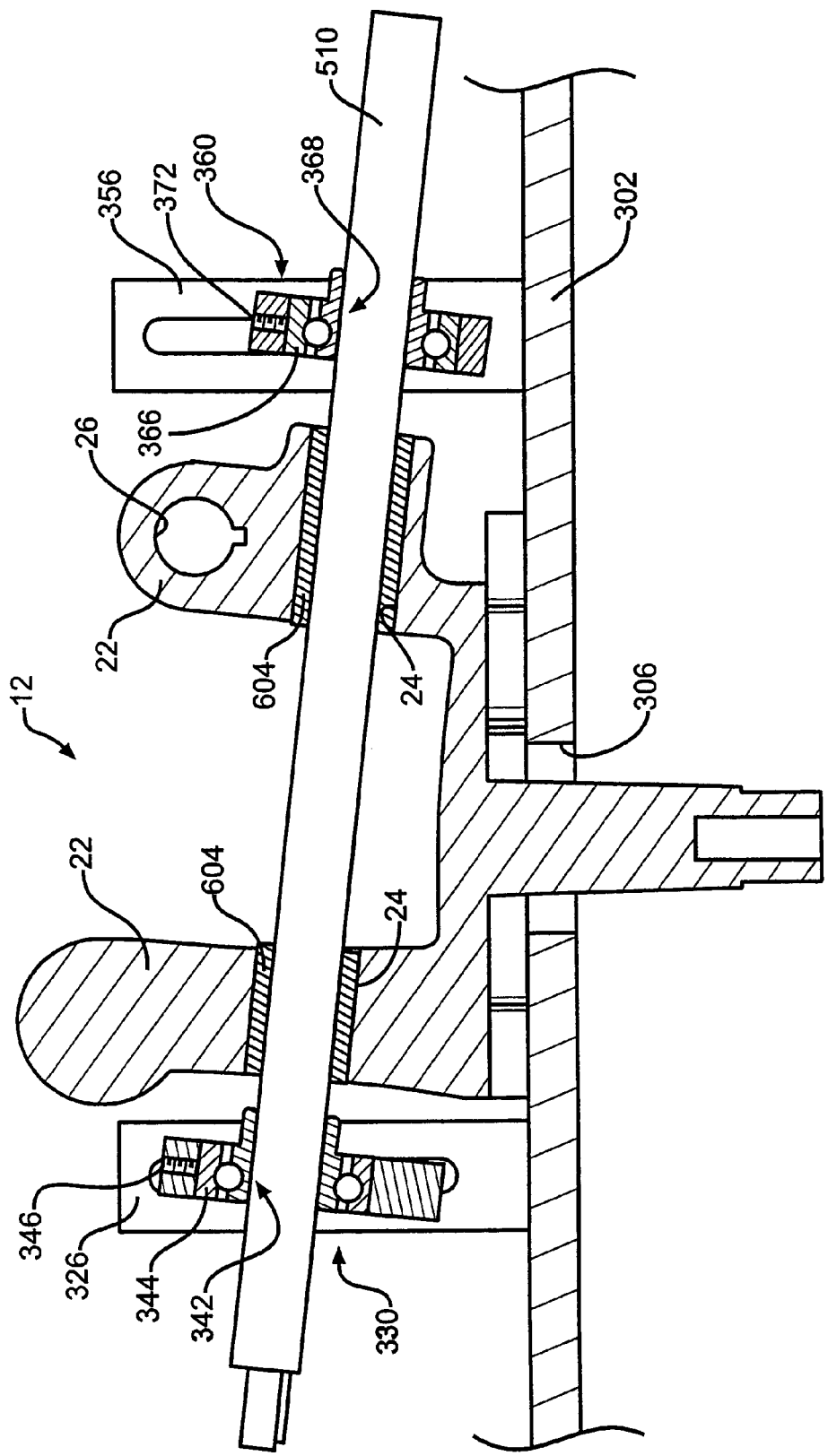
FIG. 5 is a front elevational view with portions broken away of the steering knuckle boring apparatus according to the present invention illustrating the first step of the repair method.

Similarly, the second pair of more closely spaced apart slots 322 are associated with a second pair of symmetrically arranged angle brackets 356. Each of the second pair of angle brackets 356 includes a through passageway (not illustrated) which each receive a bolt or threaded fastener 358 having an enlarged head and square cross-section portion which renders the fasteners 358 non-rotatable when installed in the slots 322. A nut and washer 362 on each of the threaded fasteners 358 rotatably releases or secures the second pair of angle brackets 356 to the support table 302 at a desired location along the second pair of slots 322. The second pair of brackets 356 support a second bearing or tailstock assembly 360. The second pair of brackets 356 each include elongate vertical slots 362 which receive bolts or threaded fasteners and washers 364 which extend through the slots 362 and are threadably received within the tailstock assembly 360. The tailstock assembly 360 includes a through aperture 366 which receives tailstock ball bearing assembly 368 as illustrated in FIG. 5. The ball bearing assembly 368 is retained within the tailstock assembly 360 by at least one set screw 372.

Figure 3:
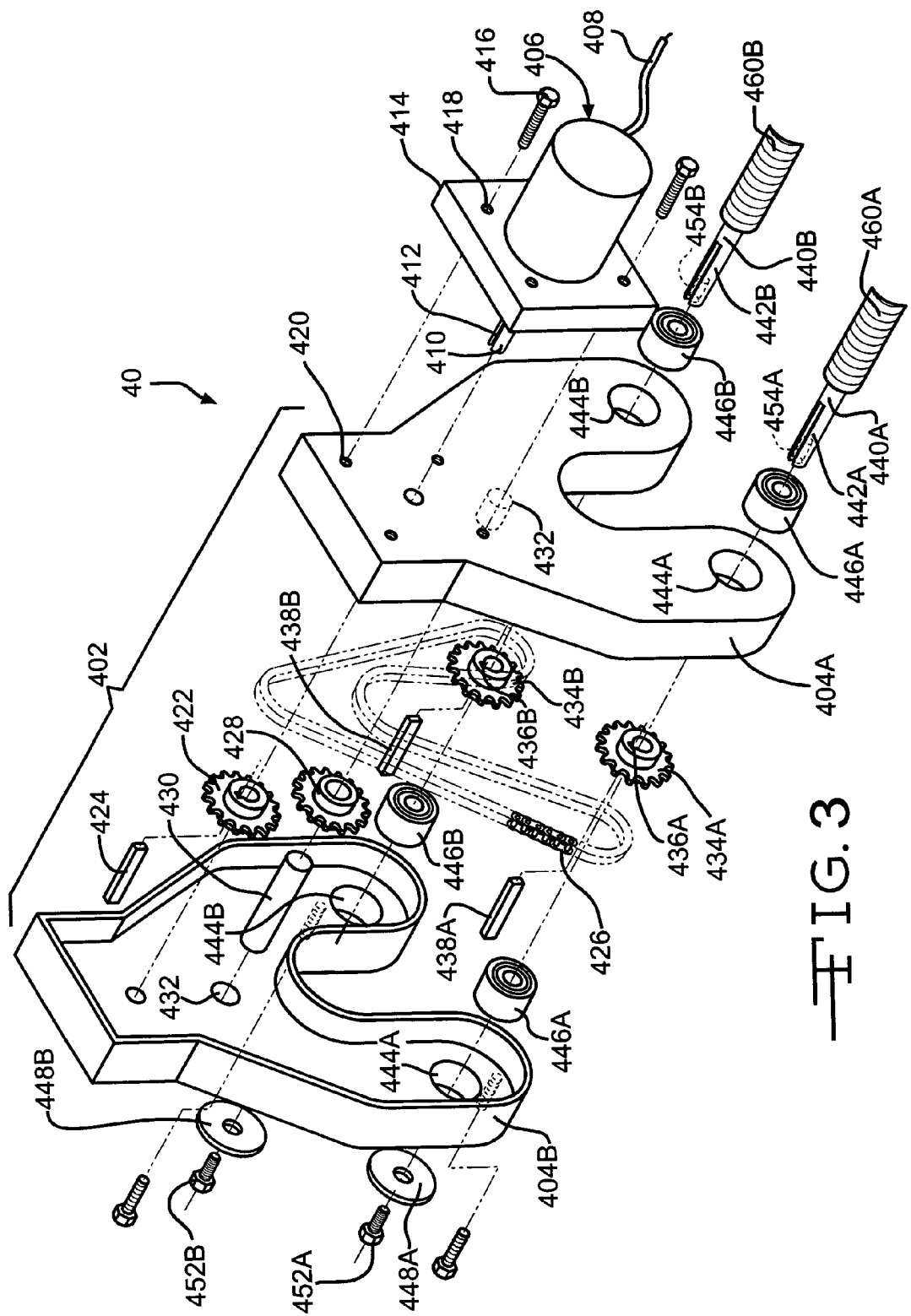
FIG. 3 is an exploded perspective view of the boring bar feed assembly in a steering knuckle boring apparatus according to the present invention.

Referring now to FIGS. 2 and 3, the boring bar feed assembly 40 includes a two-piece symmetrical housing 402 having an inverted Y-shape, having a first or front housing 404A and identically configured second or rear housing 404B. The first and second housings 404A and 404B are partially hollowed out and receive various drive components of the boring bar feed assembly 40. Secured to the outside face of the first housing assembly 404A is a variable speed, bidirectional electric motor and speed reducing assembly 406. The electric motor and speed reducing assembly 406 receives electric power through a multiple conductor cable 408 from a suitable electronic controller (not illustrated) which contains switches and circuitry and is well known in the art. The electric motor assembly 406 includes an output shaft 410 which defines a keyway 412. The electric motor assembly 406 includes a mounting plate 414. A plurality of threaded fasteners 416 extend through a plurality of suitable apertures 418 in the mounting plate 414 and are received within threaded apertures 420 in the first housing 404A. A chain drive sprocket 422 is coupled to the output shaft 410 by a key 424. An idler sprocket 428 engages the drive chain 426 and is received upon a stub shaft 430 which is received within blind apertures 432 in the first and second housings 404A and 404B. Extending around and engaging the teeth of the chain drive sprocket 422 is a drive chain 426. Similarly, the drive chain 426 engages and drives a first driven chain sprocket 434A and a second driven chain sprocket 434B. So configured, as the chain drive sprocket 422 rotates, the pair of driven chain sprockets 434A and 434B correspondingly rotate.

Each of the driven chain sprockets 434A and 434B include a keyway 436A and 436B which receives a key 438A and 438B, respectively, which positively couples the sprockets 434A and 434B to respective terminal portions of a pair of lead screws 440A and 440B having respective keyways 442A and 442B. Tightly seated within suitable circular bores 444A of the first and second housings 404A and 404B are a first pair of ball bearing assemblies 446A which each cooperatively support the terminal portion of the lead screw 440A. Similarly, a second pair of ball bearing assemblies 446B are seated within circular bores 444B of the first and second housings 404A and 404B and cooperatively support the terminal portion of the lead screw 440B. The lead screws 440A and 440B are retained within the housings 404A and 404B and the pairs of ball bearing assemblies 446A and 446B, respectively, by suitable washers 448A and 448B and threaded fasteners 452A and 452B which are received within suitable threaded openings 454A and 454B in the ends of the lead screws 440A and 440B. Each of the lead screws 440A and 440B include male threads 460A and 460B substantially along their full lengths.

Figure 4:
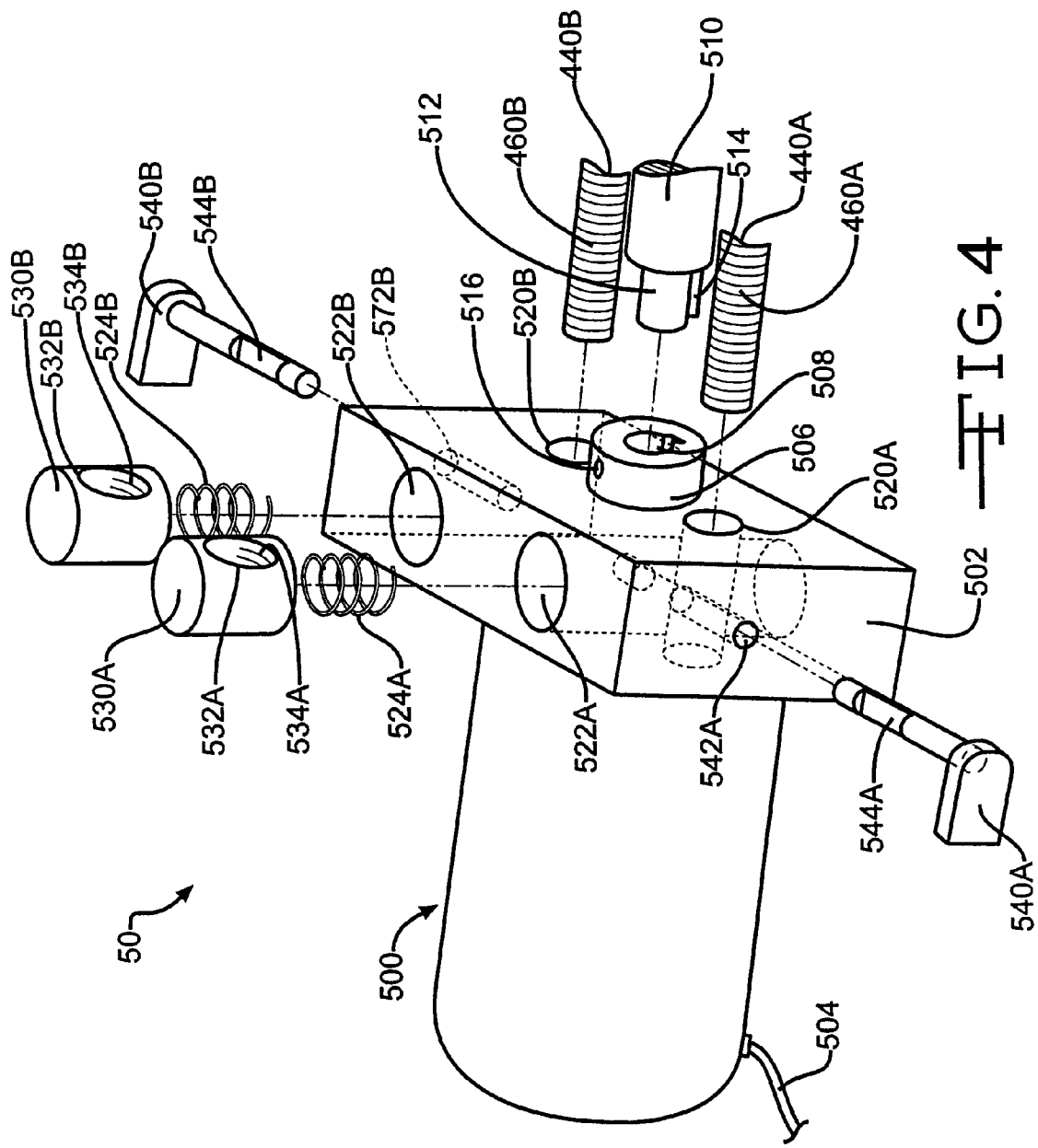
FIG. 4 is an exploded perspective view of the boring bar drive assembly of a steering knuckle boring apparatus according to the present invention.

Referring now to FIGS. 1 and 4, the boring bar drive assembly 50 includes a bidirectional electric motor and gear reduction assembly 500. The electric motor and gear reduction assembly 500 is secured to a mounting block 502 by any suitable means such as threaded fasteners (not illustrated). The electric motor and gear reduction assembly 500 is controlled by a conventional electric motor controller (not illustrated) which provides electrical energy through a multi-conductor cable 504. The controller includes conventional switches and circuitry for energizing the assembly 500, selecting the direction of rotation of the output of the assembly 500 and the speed of the output. The bi-directional electric motor and gear reduction assembly 500 drives an output shaft or member 506 which extends through the mounting block 502 and defines a female, keyed passageway 508.

A boring bar 510 includes a stub, projection, shaft or other feature 512 and key 514 which are complementary to the keyed passageway 508 in the output shaft 508 of the motor and gear reduction assembly 500 such that the boring bar 510 can be readily coupled and driven thereby as well as disassembled therefrom. A setscrew 516 disposed in a threaded, radial passageway in the output shaft or member 506 ensures a secure, positive coupling between the output shaft or member 506 and the boring bar 510. The boring bar 510 includes a radially adjustable cutting tool 518, illustrated in FIG. 2.

The mounting block 502 also includes a pair of spaced apart, through apertures 520A and 520B having diameters just slightly larger than the diameter of the lead screws 440A and 440B arranged in diametric opposition adjacent the output shaft 506. The spaced apart apertures 520A and 520B each receive a respective one of the lead screws 440A and 440B. Intersecting the through apertures 520A and 520B are larger diameter blind apertures 522A and 522B. Each of the blind apertures 522A and 522B extend into the mounting block 502, perpendicularly intersect the through apertures 520A and 520B, respectively, and extend a short distance therebeyond. Disposed within each of the blind apertures 522A and 522B are one of a pair of compression springs 524A and 524B.

Also received within the blind apertures 522A and 522B are a respective pair of releasable, thread engaging cylindrical nuts 530A and 530B. The releasable, cylindrical nuts 530A and 530B are slidably received within the respective blind apertures 522A and 522B and each includes a through radial passageway 532A and 532B, respectively. The lower portion of each of the through passageways 532A and 532B includes conventional female threads 534A and 534B which are complementary to the male threads 460A and 460B on the lead screws 440A and 440B. The apertures 532A and 532B are, however, neither circular nor do they include threads on the entire inner surface of each of the apertures 532A and 532B. Rather, the apertures 532A and 532B are oval or, more accurately, race track shaped, i.e., they define two semi-cylinders separated by two straight, tangent sides, and their upper portions are free of threads such that only when in an upper position, biased by the compression springs 524A and 524B, the female threads 534A and 534B on the lower portion of the apertures 532A and 532B of the cylindrical nuts 530A and 530B engage the threads 460A and 460B of the lead screws 440A and 440B. In this configuration, as the lead screws 440A and 440B rotate, the mounting block 502, and in fact the entire boring bar assembly 50, translates along the lead screws 440A and 440B.

The cylindrical nuts 530A and 530B are retained within the blind apertures 522A and 522B by a respective pair of retaining and actuating pins 540A and 540B. The retaining and actuating pins 540A and 540B are received within blind passageways 542A and 542B which perpendicularly intersect the passageways 522A and 522B, respectively. The pins 540A and 540B each include a cutaway region or flat 544A and 544B which engages the upper surface of a respective one of the cylindrical nuts 530A and 530B. When the pins 540A and 540B are in the positions illustrated in FIG. 4, with the flats 544A and 544B opposite or above the cylindrical nuts 530A and 530B, the cylindrical nuts 530A and 530B are driven down into a lower position such that the threads 534A and 534B no longer engage the threads 460A and 460B, respectively, on the lead screws 440A and 440B. Thus, the lead screws 440A and 440B may be removed or installed into the mounting block 502 as desired. When the pins 540A and 540B are rotated 180°, the compression springs 524A and 524B translate the cylindrical nuts 530A and 530B up, causing engagement of the threads 534A and 534B with the threads 460A and 460B, respectively, of the lead screws 440A and 44B as described directly above.

Referring now to FIGS. 1 and 5, the operation of the steering knuckle repair apparatus 10 as it relates to the boring and resleeving of the kingpin bearings of a steering knuckle 12 will be described. The first step involves adjusting the four fingers 310 which have been previously loosely secured to the support table 302 by the threaded fasteners 312 such that four apertures 16 in the brake flange 14 of the steering knuckle 12 align with end openings in the fingers 312. Bolts and nuts 602 are then installed loosely within the openings of the brake flange 14. Attention must be paid to ensuring that the bearing passageways 24 align with the pairs of slots 320 and 322 in the support table 302.

Next, centering rings 604 are installed within the bearing passageways 24 of the steering knuckle assembly 12. The centering rings 604 have an inside diameter just slightly larger than the outside diameter of the boring bar 510 such that they snuggly receive it and an outside diameter just slightly less than the inside diameter of the bearing passageways 24 in the steering knuckle 12. As illustrated in FIG. 5, the boring bar 510 is thus aligned with the axis of the bearing passageways 24 in the steering knuckle 12. At this time, the bearing 342 and the headstock assembly 330 and the bearing 368 and the tailstock assembly 360 are installed and moved as necessary within the supporting brackets 326 and 356, respectively, such that the bearings 342 and 368 support the boring bar 510 on an axis coincident with and defined by the bearing passageways 24 of the steering knuckle assembly 12.

At this time, the appropriate bolts are installed and tightened to secure the headstock assembly 330 and the tailstock assembly 360 securely to the support table 302. It should be noted that the inside faces of the bearing 342 of the headstock assembly 330 and the bearing 368 of the tailstock assembly 360 adjacent the steering knuckle assembly 12 are preferably moved to within approximately one half inch (12.7 mm.) separation from the steering knuckle assembly 12 in order to achieve a minimum unsupported length of the boring bar 510 which, as will be readily appreciated, improves the quality of all subsequent boring operations. Also, it should be stated that while the various bolts of the headstock and tailstock assemblies 330 and 360 are being tightened, it is important that none of the associated components move out of position or cause the boring bar 510 to bind as it is rotated. Next, the boring bar 510 is removed and the centering rings 604 are likewise both removed.

Figure 6:
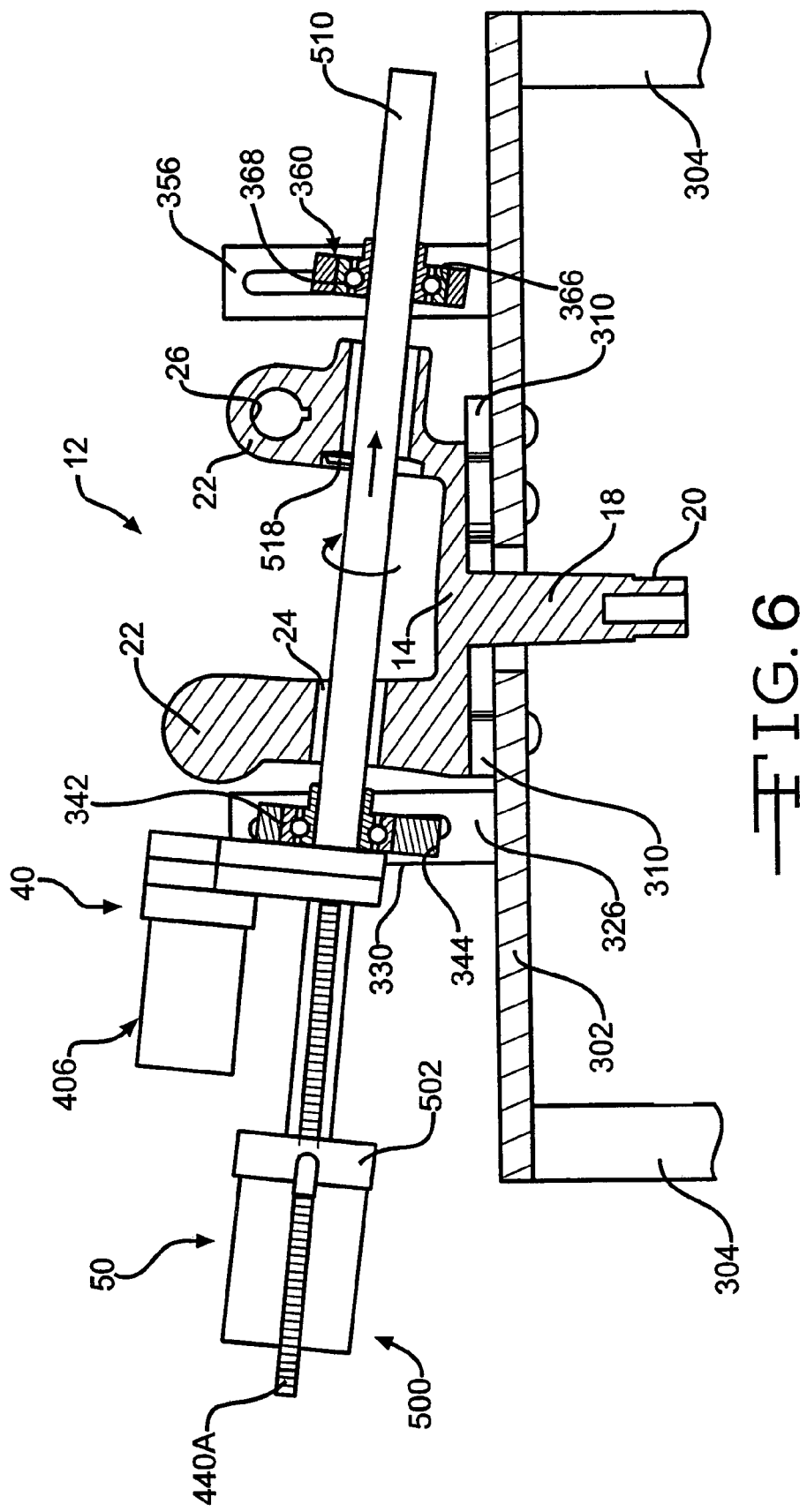
FIG. 6 is a front elevational view with portions broken away of the steering knuckle boring apparatus according to the present invention illustrating the second step of the repair method.

Referring now to FIG. 6, the boring bar 510 is reinstalled in the headstock assembly 330 and the tailstock assembly 360. Next, the boring bar feed assembly 40 is secured to the headstock assembly 330 utilizing two mounting bolts (not illustrated). Next, the boring bar drive assembly 50 is mounted on the lead screws 440A and 440B and the retaining and actuating pins 540A and 540B are appropriately manipulated to cause engagement of the threads 534A and 534B in the cylindrical nuts 530A and 530B with the threads 460A and 460B on the lead screws 440A and 440B. At this time the boring bar 510 is secured to the collar 508 and the output of the bidirectional electric drive motor 500 by tightening the setscrew 516.

Figure 7:
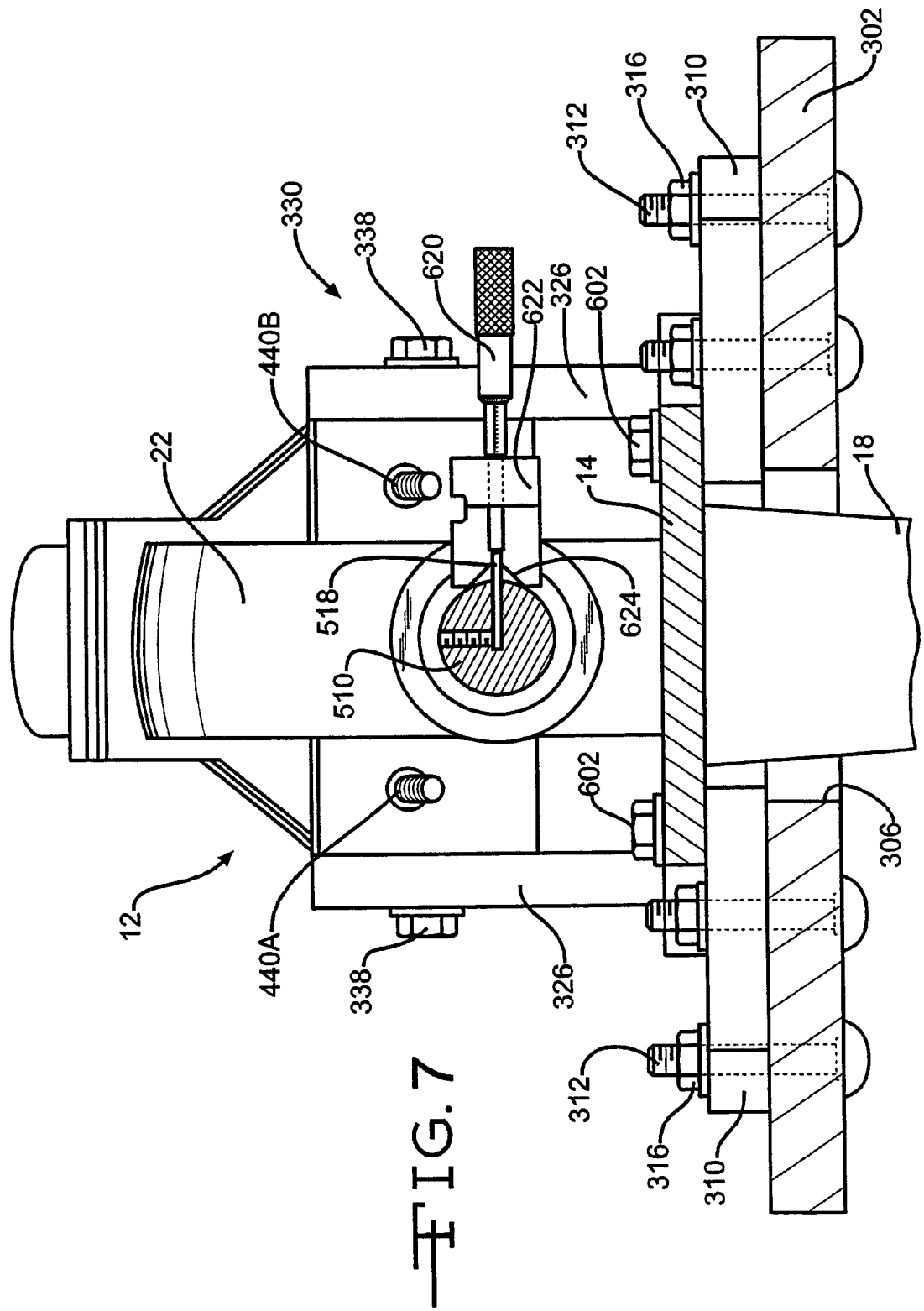
FIG. 7 is a side elevational view in partial section of the steering axle boring apparatus according to the present invention illustrating measurement and adjustment of the boring bar cutting tool.

As illustrated in FIG. 7, the cutter 518 of the boring bar 510 is then set to achieve the appropriate diameter cut within both bearing passageways 24 of the steering knuckle assembly 12. This setting is achieved through the use of a micrometer 620 which is secured to a jig or fixture 622 having a triangular throat 624 which engages the wall of the boring bar 510. Then, as illustrated in FIG. 6, boring of each bearing passageway 24 in the bearing structures 22 of the steering knuckle assembly 12 commences. Such boring is undertaken in accordance with conventional practice, the rotational speed and the feed rate of the boring bar 510 being adjusted to achieve a satisfactory cut, surface finish and cutting time. Upon completion of the boring of both bearing passageways 24, the electric motors 406 and 500, are turned off and the boring bar feed assembly 40 and boring bar drive assembly 50 removed from the headstock assembly 330. The boring bar 510 is then removed. Of course, to remove the boring bar 510 through the bearing 342 or 368, the cutting tool 518 must be released and retracted into the boring bar 510.

Turning then to FIG. 8, a pair of sleeves 630, one of which is illustrated in FIG. 8, are now installed into the just completed, enlarged bores 606. To accomplish this, a bushing installing hydraulic cylinder assembly 70 is positioned in the headstock assembly 330. The hydraulic cylinder assembly 70 includes a housing 702 which defines a cylinder having a hollow (rodless) piston 706 disposed therein. The hollow piston 706 defines a through aperture 708 which receives an elongate shaft 710. The shaft 710 includes an enlarged collar 712 and suitable fasteners 714 at both ends which retain the piston 706 and the collar 712 upon the elongate shaft 710. The housing 702 includes a necked down or smaller diameter region 720 which is received within the bearing opening 344 of the headstock assembly 330 such that the elongate rod 710 generally conforms to the axis previously defined by the bearings 342 and 368 and upon which the boring bar 510 resides when in use. A sleeve or bushing 730 is placed adjacent the collar 712 on the elongate rod 710 and the hydraulic cylinder assembly 70 is actuated such that the piston 706 moves to the left, as illustrated in FIG. 8, drawing the sleeve or bushing 730 into the aperture 606 of the bearing structure 22 of the steering knuckle 12. A second sleeve (not illustrated) is similarly installed in the other bearing aperture 606 by removal and reinstallation of the hydraulic cylinder assembly 70 in the tailstock assembly 360.

Figure 9:
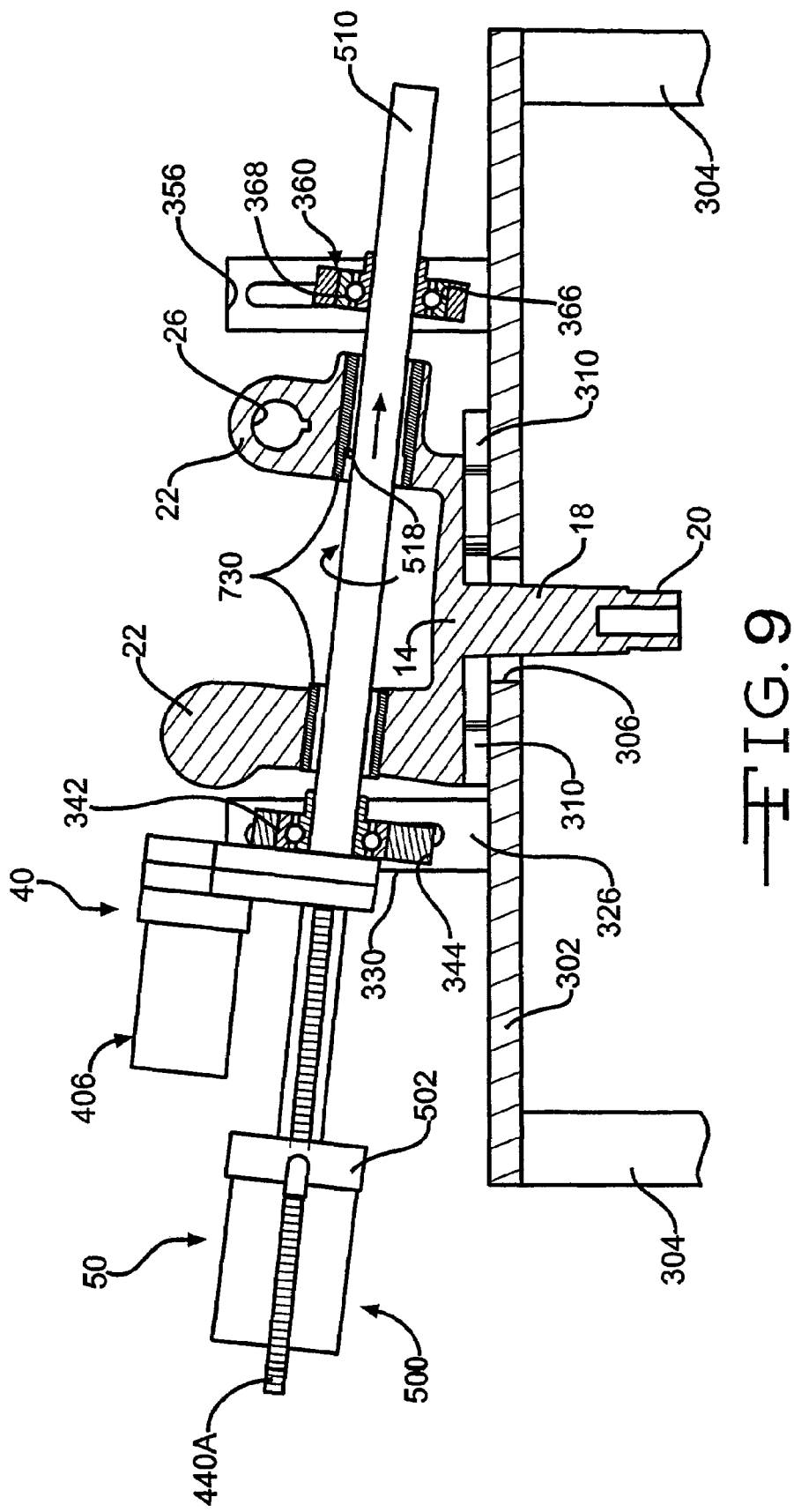
FIG. 9 is a side elevational view in partial section of a steering knuckle boring apparatus according to the present invention illustrating the boring to size of the installed sleeve.

Referring now to FIG. 9, the boring bar feed assembly 40, the boring bar drive assembly 50 and the boring bar 510 are once again installed in the headstock and tailstock assemblies 330 and 360 as illustrated. Again, the radial position of the cutter or cutting tool 518 is adjusted by use of a micrometer such as illustrated in FIG. 7 and the just installed bearing sleeves 730 are bored out to the exact desired diameter to receive a kingpin (not illustrated). Upon completion of the boring of the inside diameters of both of the sleeves 730, the boring bar feed assembly 40, the boring bar drive assembly 50 and the boring bar 510 are all removed from the headstock and tailstock assemblies 330 and 360. Next, the bolts and nuts 602 are loosened and removed and the steering knuckle assembly 12 is removed from the support table 302. The steering knuckle assembly 12 is now ready for reassembly with the motor vehicle.

In order to facilitate compact storage, the headstock and tailstock assemblies 330 and 360 as well as the fingers 310, if desired, may be removed from the support table 302.

As illustrated in FIGS. 1, 3 and 4, the first embodiment repair apparatus 10 includes separable and independent assemblies for feeding and rotating the boring bar 510, namely, the boring bar feed assembly 40 and the boring bar drive assembly 50. In a second embodiment repair apparatus 800, partially illustrated in FIGS. 10 and 11, the two boring bar feed and drive assemblies 40 and 50 are combined into a single unit, a boring bar power assembly 810.

Figure 10:
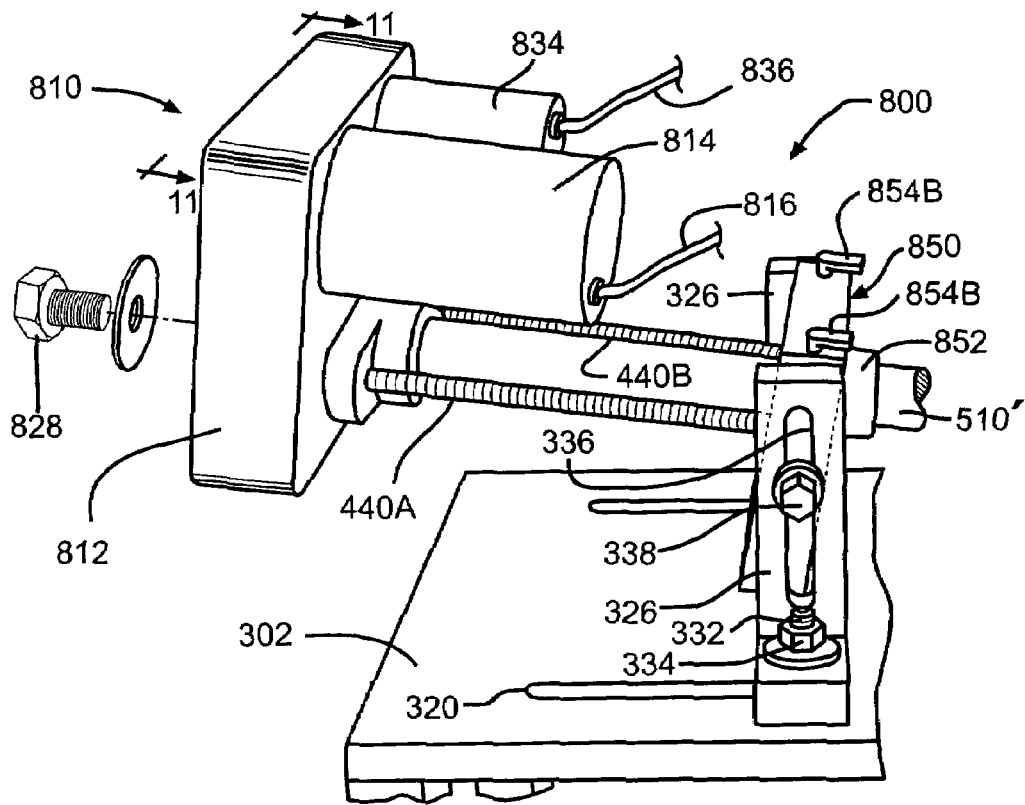
FIG. 10 is a perspective view of a portion of a second embodiment of a steering knuckle boring apparatus according to the present invention.
Figure 11:
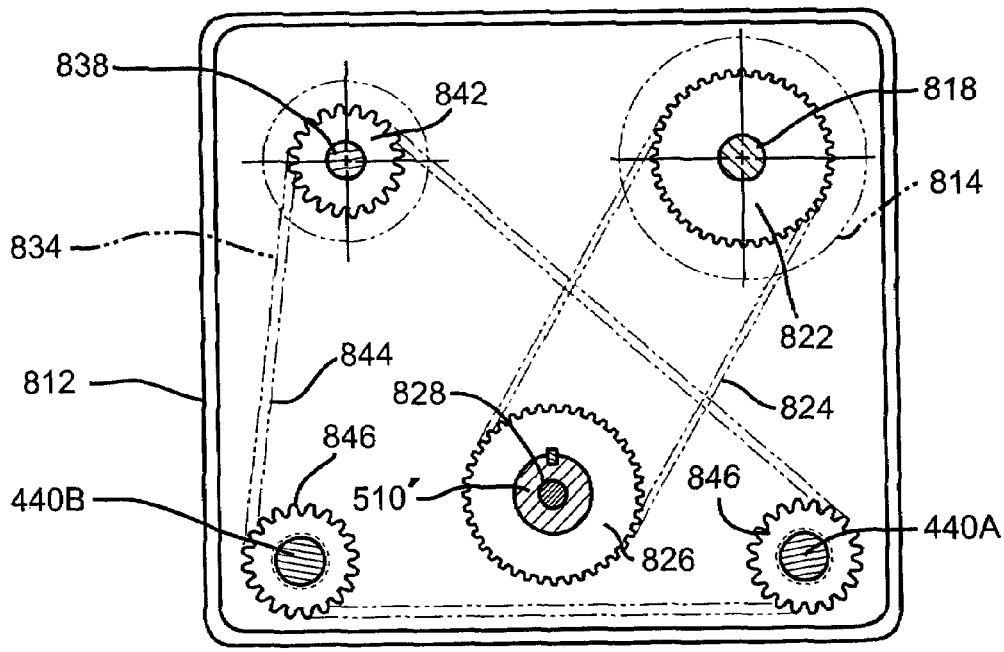
FIG. 11 is a full sectional view of a drive unit of a second embodiment of a steering knuckle boring apparatus according to the present invention taken along line 11-11 of FIG. 10.

Referring now to FIGS. 10 and 11, the second embodiment repair apparatus 800 includes a common or unified boring bar power assembly 810 which includes a housing 812 to which is mounted a first bi-directional electric motor and gear reduction assembly 814 for rotating the boring bar 510. The housing 812 is preferably fabricated of aluminum and includes a plate or cover (not illustrated) which closes and protects components within the housing 812. The electric motor and gear reduction assembly 814 may be identical to the electric motor and gear reduction assembly 500 of the first embodiment repair apparatus 10. As such, it includes a multiple conductor cable 816 which connects the electric motor and gear reduction assembly 814 to a conventional electronic variable speed, bidirectional motor controller (not illustrated) which contains switches and circuitry and is well known in the art. As illustrated in FIG. 11, the electric motor and gear reduction assembly 814 includes an output shaft 818 having an output pinion 822 which is engaged by and drives a complementary chain or timing belt 824 which in turn engages and drives a driven pinion 826 coupled to the boring bar 510 by a key and threaded fastener 828.

Also mounted upon the housing 812 is a second, bi-directional electric motor and gear reduction assembly 834. The second electric motor and gear reduction assembly 834 receives electrical energy through a multiple conductor cable 836 from a suitable bi-directional, variable speed electronic controller (not illustrated) which contains switches and circuitry and is well known in the art. The electric motor and gear reduction assembly 834 includes an output shaft 838 which is secured to and drives an output pinion 842 which is engaged by and drives a complementary chain or timing belt 844 which, in turn, engages and drives a pair of driven pinions 846. Each of the driven pinions 846 is secured to and rotates a threaded lead screw 440A or 440B extending from the housing 812.

The second embodiment repair apparatus 800 also includes a headstock assembly 850 which includes a removable ball bearing assembly 852 which rotatably receives and supports the boring bar 510. The headstock assembly 850 also includes a pair of retaining and actuating pins 854A and 854B which actuate a respective pair of spring biased, releasable, thread engaging cylindrical nuts (not illustrated). These components are the same as and function in a manner identical to the components illustrated in FIG. 4 to engage and release the lead screws 440A and 440B, so that the boring bar drive assembly 810 may be assembled with or removed from the headstock assembly 850.

When the actuating pins 854A and 854B are in their released positions, the leadscrews 440A and 440B may be installed, along with the boring bar power assembly 810, in the headstock 850. When the actuating pins 854A and 854B are in their actuated positions, the leadscrews 440A and 440B are engaged by the cylindrical bits and rotation of the leadscrews 440A and 440B advances or retracts the boring bar power assembly 810 and the boring bar 510 attached thereto.

The headstock assembly 850 is supported on a first pair of angle brackets 326 having vertical elongate slots 336 and secured thereto by threaded fasteners 338. The brackets 326 are secured to the support table 302 by threaded fasteners 332 which pass through slots 320 and are secured by nuts and washers 334. The other components of the second embodiment repair apparatus 800 not illustrated in FIG. 10 are the same and function the same as those of the first embodiment repair apparatus 10.

Although the foregoing apparatus and method have been described within the context of repair to a motor vehicle steering knuckle, it should be understood that the disclosure relates more broadly to similar repair of an article of manufacture having one or more aligned bores, sleeves or bearing openings oriented at an oblique angle to a planar and/or circular reference plate, component or surface. That is, the apparatus and method may be utilized and adapted to bore or true any bore or aligned bores disposed at an oblique angle to a reference feature or component of an assembly.

As any person skilled in the art of specialized boring apparatus and method and particularly to an apparatus and method for repairing worn and oversized bearing openings in motor vehicle steering knuckle assemblies will recognize from the previous detailed description and from the figures and claims, modifications and changes can be made to the preferred embodiment of the invention without departing from the scope of this invention defined in the following claims.

I claim:

1. A vehicle steering component repair apparatus comprising, in combination,
   a plate having an opening adapted to receive a portion of a steering component and a plurality of pairs of generally arcuate slots disposed about said opening, each of said pairs of arcuate slots having an inner slot and an outer slot,
   a plurality of support members associated with said plurality of pairs of arcuate slots and having means for securement to said table and said steering component,
   a pair of adjustable boring bar supports disposed proximate said pairs of arcuate slots and adapted for securement to said plate,
   a boring bar having a cutter and disposed in said supports along an axis coincident with an axis of bearings of said steering component, and
   a drive unit for rotating and axially translating said boring bar.

2. The vehicle steering component repair assembly of claim 1, wherein said pair of boring bar supports include adjustments of an angle between said boring bar and said plate and a distance between said boring bar and said plate.

3. The vehicle steering component repair assembly of claim 1, wherein said vehicle steering component is a steering knuckle.

4. The vehicle steering component repair assembly of claim 1, further including at least one bearing insert for facilitating alignment of said boring bar along said axis of a bearing in said steering component.

5. The vehicle steering component repair assembly of claim 1, wherein said drive unit includes a first drive assembly having a first motor for rotating said boring bar and a second drive assembly for axially translating said boring bar.

6. The vehicle steering component repair assembly of claim 5, wherein said second drive assembly includes a pair of threaded shafts and further including a pair of nut segments disposed in said one of said boring bar supports and means for selectively engaging said nut segments with said threaded shafts.

7. The vehicle steering component repair assembly of claim 1, further including means for inserting a sleeve into a bored aperture in said vehicle steering component.

8. The vehicle steering component repair assembly of claim 1, wherein said plate includes pairs of parallel slots disposed proximate said arcuate openings for mounting said boring bar supports and said support members include openings for receiving means for securing said support members to said table.

9. A vehicle steering component repair apparatus comprising, in combination,
   a planar support having an opening adapted to receive a portion of a steering component having bearing openings and a plurality of pairs of generally arcuate slots disposed about said opening, each of said pairs of arcuate slots having an inner slot and an outer slot,
   a plurality of adjustable supports associated with said plurality of pairs of arcuate slots and having means for securing said adjustable supports to said planar support and said steering component,
   a pair of adjustable boring bar supports disposed on opposite sides of said opening and adapted for securement to said planar support,
   a boring bar disposed in said boring bar supports along an axis coincident with an axis of said bearing openings of said steering component, and
   a drive unit for rotating and axially translating said boring bar.

10. The vehicle steering component repair assembly of claim 9, wherein said pair of boring bar supports includes means for adjusting an angle between said boring bar and said planar support and a distance between said boring bar and said planar support.

11. The vehicle steering component repair assembly of claim 9, further including means for inserting a sleeve into a bored aperture in said vehicle steering component.

12. The vehicle steering component repair assembly of claim 9, wherein said drive unit includes a first drive assembly for rotating said boring bar and a second, separable drive assembly for axially translating said boring bar.

13. The vehicle steering component repair assembly of claim 9, wherein said drive unit is unitary and includes drive assemblies for rotating and axially translating said boring bar.

14. The vehicle steering component repair assembly of claim 9, wherein said adjustable supports include a slot for receiving said means for securing.

15. A vehicle steering component repair apparatus comprising, in combination,
   a planar support having a centrally disposed opening adapted to receive a portion of a steering component and a plurality of pairs of generally curved slots disposed about said opening, each of said pairs of curved slots having an inner slot and an outer slot,
   a plurality of adjustable supports associated with said plurality of pairs of curved slots and adapted to receive a steering component having bearing openings defining an axis,
   a plurality of fasteners extending through said adjustable supports and said curved slots of said planar support for securing said supports to said planar support,
   a pair of spaced-apart adjustable boring bar supports on opposite sides of said centrally disposed opening and secured to said planar support,
   a boring bar disposed in said boring bar supports along an axis coincident with said axis of said bearing openings, and a drive unit for rotating and axially translating said boring bar.

16. The vehicle steering component repair assembly of claim 15, further including two pairs of parallel slots in said planar support spaced from said centrally disposed opening and a plurality of fasteners extending through said boring bar supports and said parallel slots for securing said boring bar supports to said planar support.

17. The vehicle steering component repair assembly of claim 15, further including a plurality of legs secured to said planar support.

18. The vehicle steering component repair assembly of claim 15, wherein said pair of spaced-apart adjustable boring bar supports each includes an elongate slot and a fastener received within said elongate slot.

19. The vehicle steering component repair assembly of claim 15, further including a boring bar support block disposed between said pair of spaced-apart adjustable boring bar supports, said support block having a removable boring bar bearing disposed therein.

20. The vehicle steering component repair assembly of claim 15, wherein said drive unit includes a pair of lead screws extending between said drive unit and a boring bar support block disposed between said pair of spaced-apart adjustable boring bar supports.

* * * * *